US012334506B2

(12) United States Patent
Sung et al.

(10) Patent No.: US 12,334,506 B2
(45) Date of Patent: Jun. 17, 2025

(54) ELECTRODE ASSEMBLY MANUFACTURING METHOD, ELECTRODE ASSEMBLY, AND ELECTROCHEMICAL DEVICE INCLUDING THE SAME

(71) Applicant: LG ENERGY SOLUTION, LTD., Seoul (KR)

(72) Inventors: In Hyouk Sung, Daejeon (KR); Sang Joon Lee, Daejeon (KR); Kyung Ryun Ka, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 652 days.

(21) Appl. No.: 17/637,934

(22) PCT Filed: Oct. 16, 2020

(86) PCT No.: PCT/KR2020/014204
§ 371 (c)(1),
(2) Date: Feb. 24, 2022

(87) PCT Pub. No.: WO2021/080258
PCT Pub. Date: Apr. 29, 2021

(65) Prior Publication Data
US 2022/0285722 A1 Sep. 8, 2022

(30) Foreign Application Priority Data
Oct. 21, 2019 (KR) .................. 10-2019-0130851

(51) Int. Cl.
*H01M 50/40* (2021.01)
*H01M 10/058* (2010.01)
(Continued)

(52) U.S. Cl.
CPC ....... *H01M 10/058* (2013.01); *H01M 10/446* (2013.01); *H01M 50/403* (2021.01); *H01M 50/449* (2021.01); *H01M 50/46* (2021.01)

(58) Field of Classification Search
CPC ............ H01M 10/058; H01M 10/446; H01M 50/403; H01M 50/449
See application file for complete search history.

(56) References Cited

U.S. PATENT DOCUMENTS 5,681,357 A 10/1997 Eschbach et al.
6,426,165 B1 7/2002 Coustier et al.
(Continued)

FOREIGN PATENT DOCUMENTS

| CN | 103779527 A | 5/2014 |
|---|---|---|
| CN | 107210412 A | 9/2017 |

(Continued)

OTHER PUBLICATIONS

JP2014139880A Machine Translation (Year: 2014).*
(Continued)

*Primary Examiner* — Maria Laios
*Assistant Examiner* — Ziheng Lu
(74) *Attorney, Agent, or Firm* — Birch, Stewart, Kolasch & Birch, LLP

(57) ABSTRACT

Disclosed is an electrode assembly manufacturing method, in which, in a step of stacking and pressing electrodes and a separator, the pressing is performed in that state in which pores of a porous substrate are filled with a polymer solution. The form or volume of the pores is not changed due to the polymer solution. Consequently, porosity of the separator after manufacture of an electrode assembly is similar to porosity of the separator before stacking. As a result, a battery including the electrode assembly has high ionic conductivity and excellent performance.

11 Claims, 7 Drawing Sheets

(51) Int. Cl.
  *H01M 10/44*  (2006.01)
  *H01M 50/403*  (2021.01)
  *H01M 50/449*  (2021.01)
  *H01M 50/46*  (2021.01)

(56) References Cited

U.S. PATENT DOCUMENTS

| | | | |
|---|---|---|---|
| 2001/0008735 A1 | 7/2001 | Andrieu et al. | |
| 2003/0118895 A1* | 6/2003 | Oh | H01M 50/417 29/623.5 |
| 2003/0175593 A1* | 9/2003 | Chen | H01M 50/44 429/251 |
| 2005/0005431 A1 | 1/2005 | Koo et al. | |
| 2006/0003209 A1 | 1/2006 | Kim et al. | |
| 2014/0370361 A1 | 12/2014 | Cheong et al. | |
| 2015/0372343 A1 | 12/2015 | Mitsuhashi | |
| 2016/0056435 A1 | 2/2016 | Takeda | |
| 2017/0324073 A1 | 11/2017 | Herle | |
| 2018/0309108 A1 | 10/2018 | Shin et al. | |
| 2020/0266407 A1 | 8/2020 | Honda et al. | |

FOREIGN PATENT DOCUMENTS

| | | |
|---|---|---|
| JP | 10-255849 A | 9/1998 |
| JP | 2005-19157 A | 1/2005 |
| JP | 2009-110886 A | 5/2009 |
| JP | 2014-139880 A | 7/2014 |
| JP | 2014-150027 A | 8/2014 |
| KR | 10-2004-0005664 A | 1/2004 |
| KR | 10-2005-0041513 A | 5/2005 |
| KR | 10-0553742 B1 | 2/2006 |
| KR | 10-2006-0042325 A | 5/2006 |
| KR | 10-1151332 B1 | 6/2012 |
| KR | 10-2013-0105180 A | 9/2013 |
| KR | 10-2014-0050874 A | 4/2014 |
| KR | 10-2014-0060044 A | 5/2014 |
| KR | 10-2014-0145813 A | 12/2014 |
| KR | 10-2016-0127475 A | 11/2016 |
| KR | 10-2018-0077189 A | 7/2018 |
| KR | 10-2019-0025462 A | 3/2019 |

OTHER PUBLICATIONS

International Search Report (PCT/ISA/210) issued in PCT/KR2020/014204, dated Jan. 20, 2021.

Extended European Search Report for European Application No. 20879203.6, dated Oct. 29, 2024.

* cited by examiner

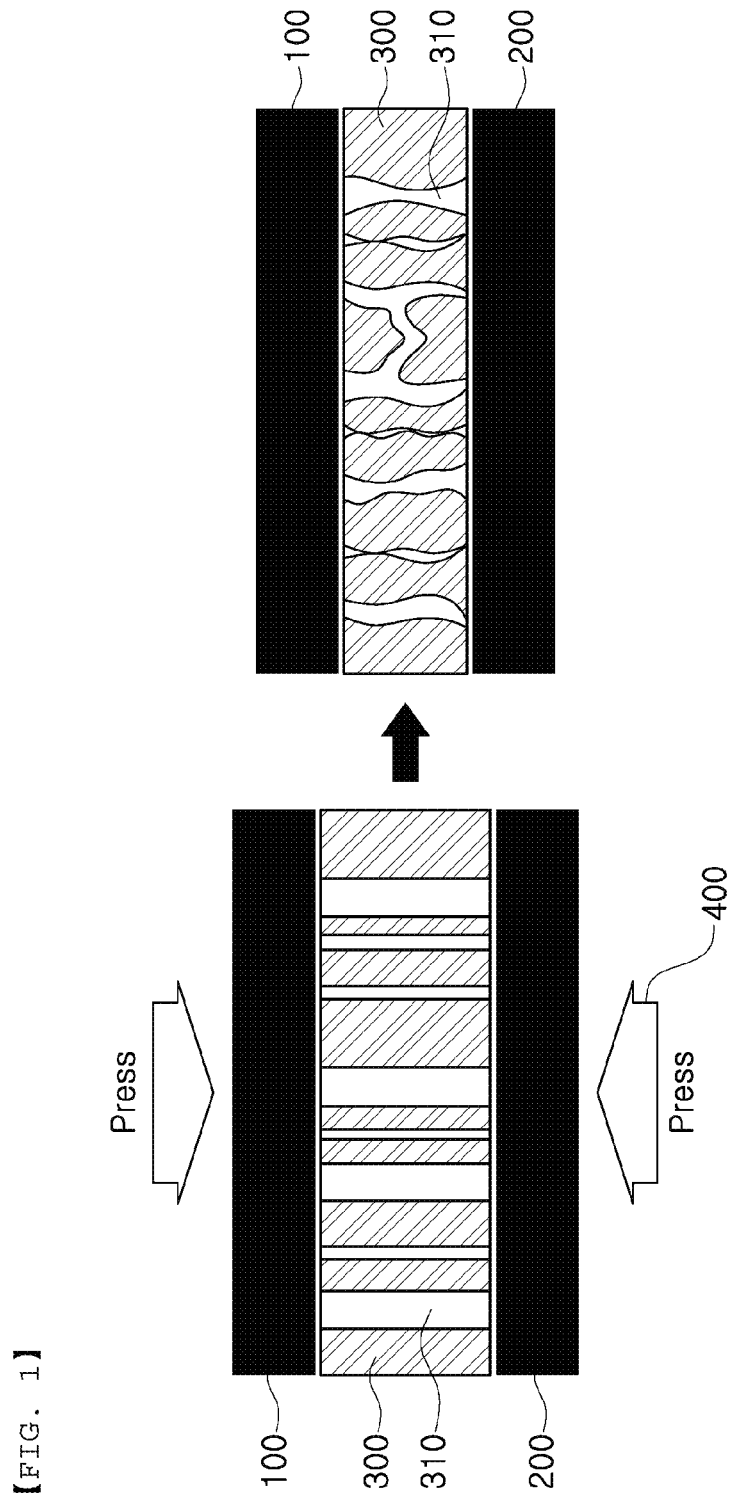

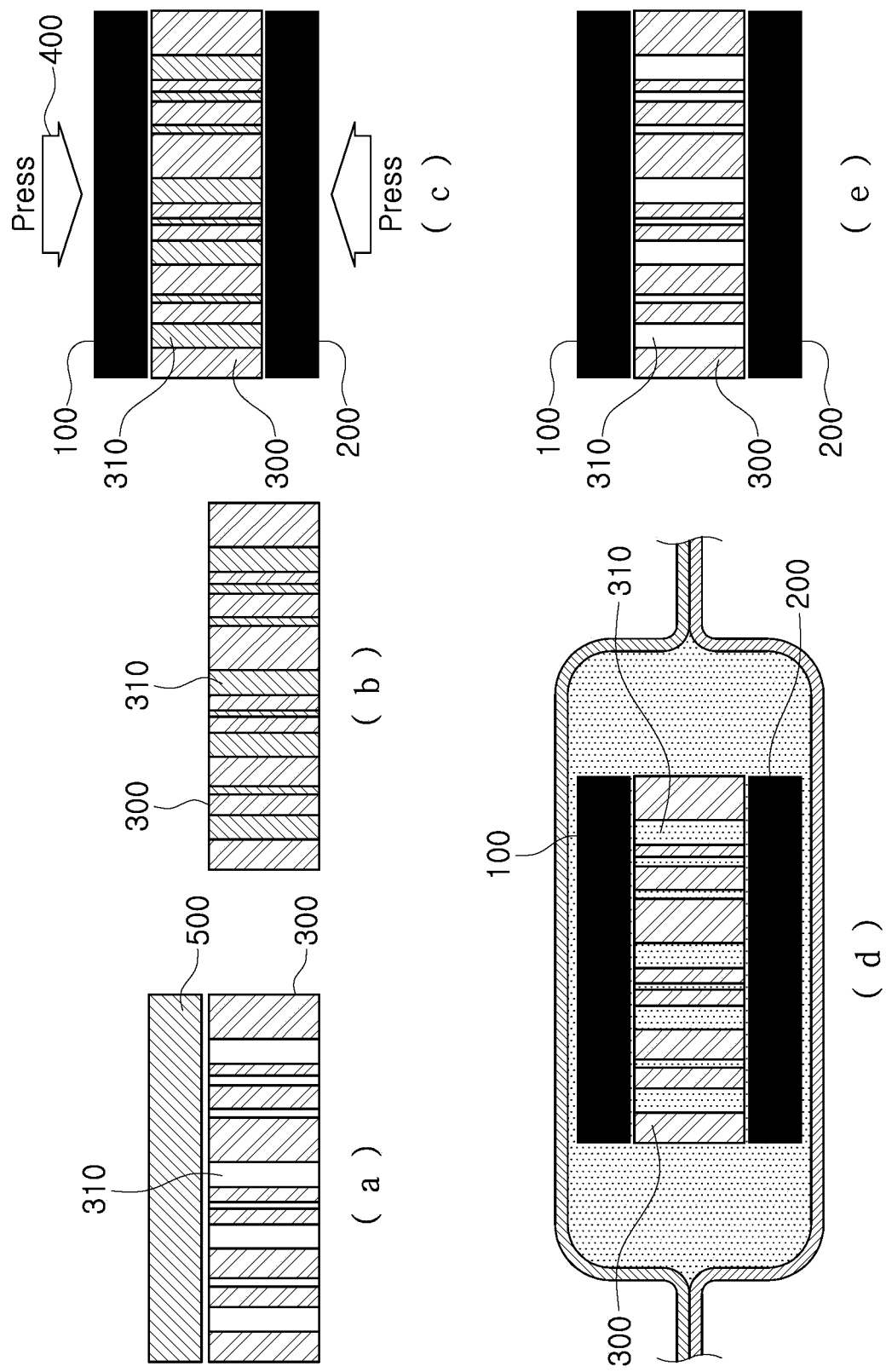
[FIG. 2]

[FIG. 3a]
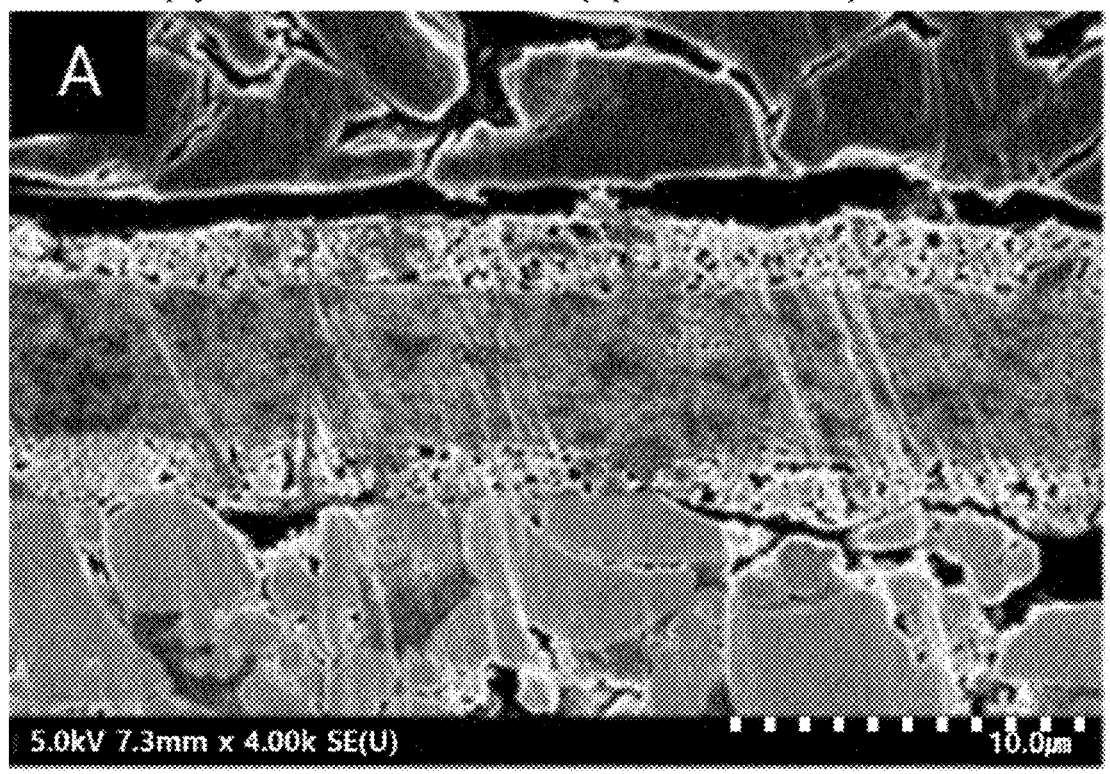

[FIG. 3b]
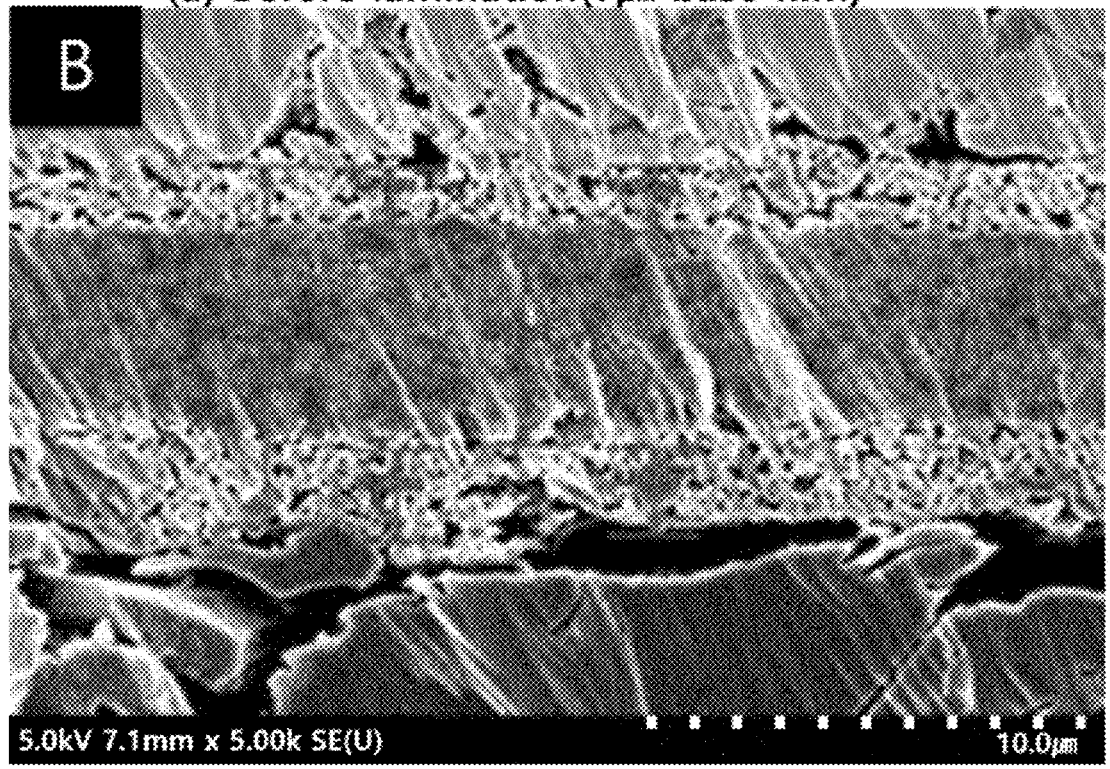

[FIG. 3c]
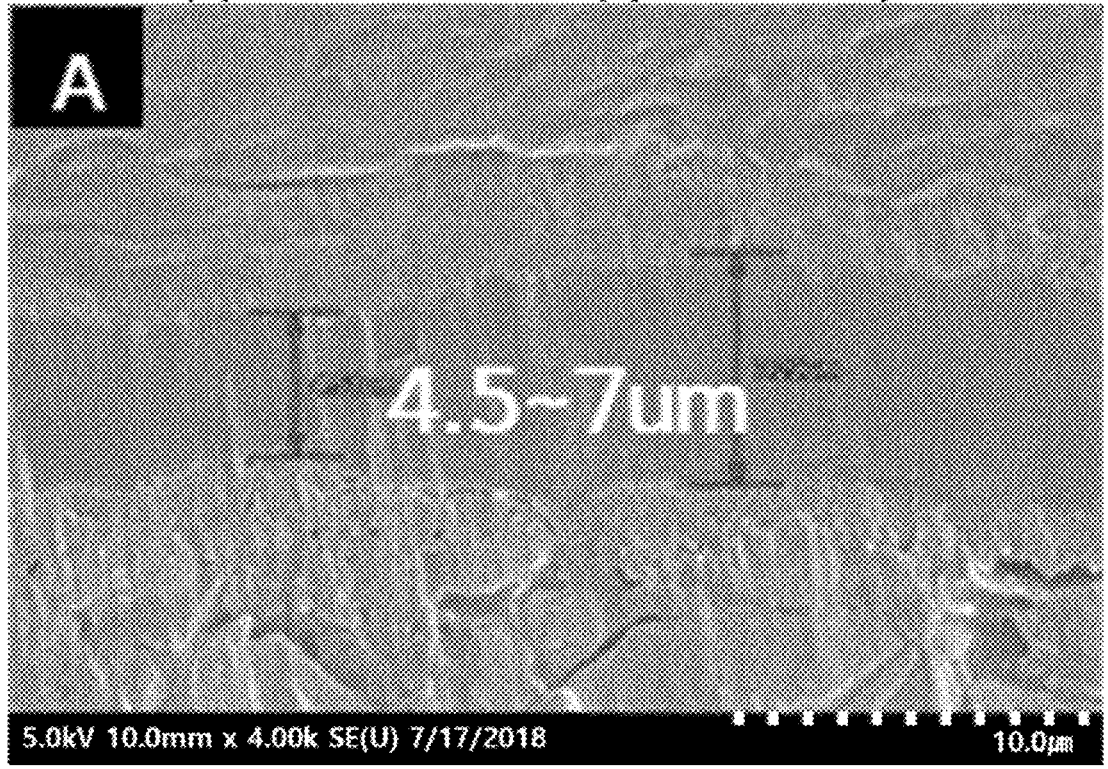

[FIG. 3d]
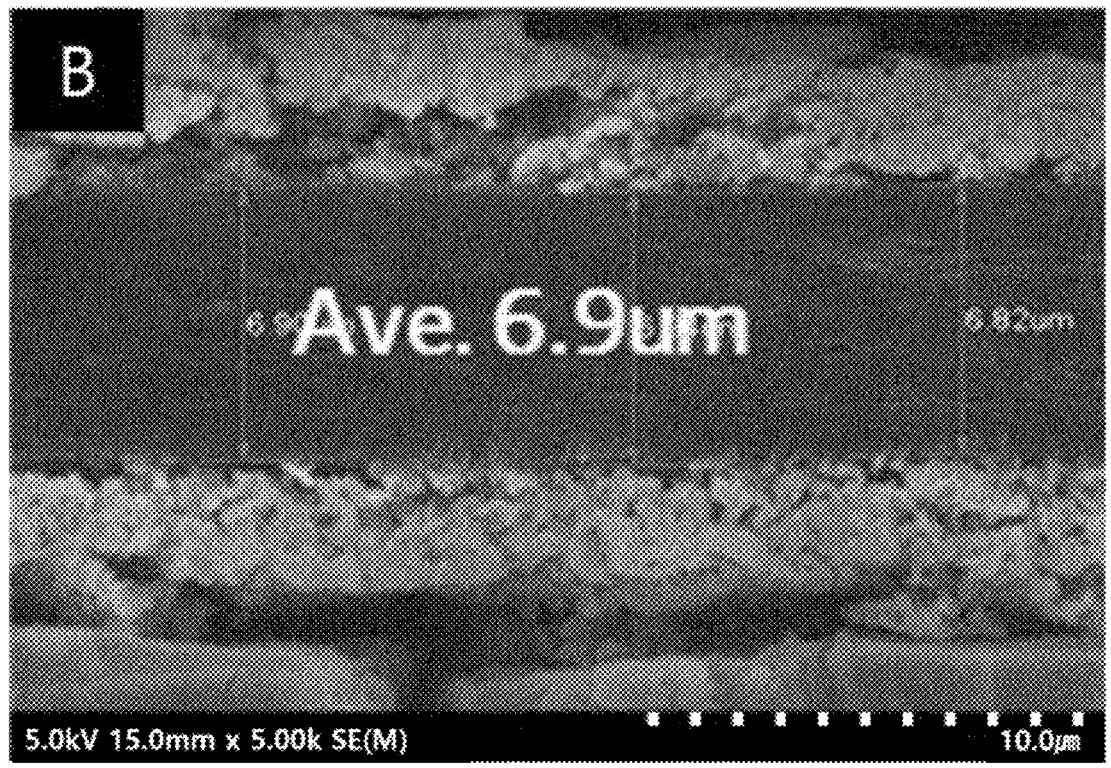

[FIG. 4]
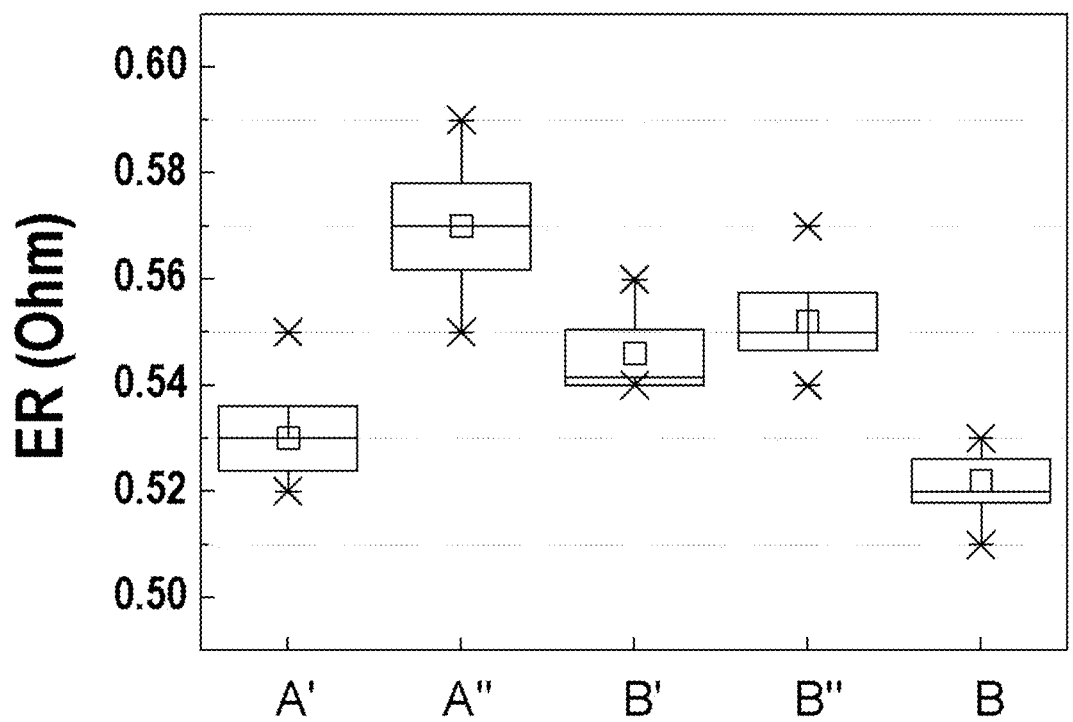

ELECTRODE ASSEMBLY MANUFACTURING METHOD, ELECTRODE ASSEMBLY, AND ELECTROCHEMICAL DEVICE INCLUDING THE SAME

TECHNICAL FIELD

This application claims the benefit of priority to Korean Patent Application No. 2019-0130851 filed on Oct. 21, 2019, the disclosure of which is hereby incorporated by reference herein its entirety.

The present invention relates to an electrode assembly manufacturing method, and more particularly to an electrode assembly manufacturing method capable of, when a separator having a porous substrate is laminated to manufacture an electrode assembly, preventing a decrease in porosity of the porous substrate, an electrode assembly manufactured by the manufacturing method, and an electrochemical device including the same.

BACKGROUND ART

A separator, which is an element constituting a secondary battery, is a polymer film located between a positive electrode and a negative electrode, the polymer film having a porous structure. The separator allows an electrolyte and ions to pass therethrough while isolating the positive electrode and the negative electrode from each other to prevent electric short circuit between the two electrodes. The separator itself does not participate in electrochemical reaction of a battery. However, the separator affects the performance and safety of the battery due to physical properties thereof, such as electrolytic solution wettability and porosity.

The output of the battery is increased in proportion to ionic conductivity in the battery. That is, in the case in which time taken for ions to pass through the separator is shortened, the performance of the battery is further improved. The time taken for the ions to pass through the separator is expressed by Gurley number. The Gurley number is influenced by the pore ratio, pore size, pore distortion degree, and thickness of the separator. In order to increase the performance of the battery, it is important to provide a separator configured such that the overall thickness of the separator is small and the separator is provided with pores that are large and have a low degree of distortion.

Patent Document 1 uses nanofiber non-woven fabric instead of a conventional polyolefin-based separator in order to improve heat resistance and air permeability of a separator but does not recognize a method of uniformly forming pores while reducing the degree of distortion of the pores.

Patent Document 2 discloses a separator including a fiber layer having pores arranged at predetermined intervals. The fiber layer is disposed such that the pores are located vertically, whereby external stress is uniformly dispersed, and compression resistance is exhibited. However, the separator has a dual layer structure, whereby ionic conductivity of a battery is reduced.

Research to improve the performance of a battery through a conventional separator has been conducted. Specifically, research to improve porosity of a porous substrate used as a separator or to change the structure of the porous substrate in order to secure high porosity has been conducted.

FIG. 1 is a schematic view showing a conventional method of pressing a positive electrode, a negative electrode, and a separator in the state in which the separator is interposed between the positive electrode and the negative electrode.

In the case in which stacking is performed in a conventional manner in which a positive electrode 100, a negative electrode 200, and a separator porous substrate 300 are pressed in the state in which the separator is interposed between the positive electrode and the negative electrode, as shown in FIG. 1, pores 310 may be distorted, or the sizes of the pores may be reduced, by pressing force 400. As a result, even in the case in which the performance of the separator porous substrate 300 is improved by improving porosity or changing the structure of the porous substrate, the effect is reduced while the separator porous substrate 300 is stacked to manufacture an electrode assembly. The separator porous substrate 300 shown in FIG. 1 is constituted by a porous substrate alone or includes an inorganic material coated on at least one surface of the porous substrate. This is equally applicable to a separator porous substrate 300 mentioned below in the present invention. An inorganic layer that may be coated on at least one surface of the porous substrate is not shown in FIG. 1. Meanwhile, in FIG. 1, each pore 310 of the separator is simplified as a straight line. However, each pore of a separator according to the present invention is not limited to a straight line.

PRIOR ART DOCUMENTS

Patent Documents (Patent Document 1) Korean Patent Application Publication No. 2014-0060044 (2014.05.19)
(Patent Document 2) Korean Patent Application Publication No. 2014-0050874 (2014.04.30)

DISCLOSURE

Technical Problem

The present invention has been made in view of the above problems, and it is an object of the present invention to provide an electrode assembly manufacturing method capable of, when a separator is laminated to manufacture an electrode assembly, preventing a decrease in porosity of the separator, an electrode assembly manufactured by the manufacturing method, and an electrochemical device including the same.

Technical Solution

In order to accomplish the above object, the present invention provides an electrode assembly manufacturing method including 1) dissolving a polymer soluble in an electrolytic solution in a solvent to manufacture a polymer solution, 2) filling pores of a separator porous substrate with the polymer solution of step 1) to form a separator, 3) manufacturing a stack including the separator of step 2) and at least one electrode by pressing, 4) injecting a primary electrolytic solution into the stack of step 3) to discharge the polymer solution in the pores of the separator to the outside of the stack, and 5) injecting a secondary electrolytic solution into the stack of step 4).

The solvent of step 1) may not be an electrolytic solution.

The filling the pores of the porous substrate with the polymer solution of step 2) may include applying the polymer solution to the porous substrate or impregnating the porous substrate with the polymer solution.

The electrode assembly manufacturing method may further include drying the separator after step 2).

The electrode assembly manufacturing method may further include further coating at least one surface of the separator after step 2).

Stacking may be performed so as to include a heat resistance layer in step 3).

The pressing of step 3) may be performed in a high pressure or high temperature condition.

The primary electrolytic solution and the secondary electrolytic solution may be mixable with each other.

The primary electrolytic solution and the secondary electrolytic solution may be identical to each other.

The polymer soluble in the electrolytic solution in step 1) may be a PVdF-based polymer, and the solvent may be an organic solvent.

The electrode assembly manufacturing method may further include performing initial charging and discharging after step 5).

The present invention may provide an electrode assembly manufactured by the manufacturing method.

In addition, the present invention may provide an electrochemical device including the electrode assembly.

In the present invention, one or more constructions that do not conflict with each other may be selected and combined from among the above constructions.

DESCRIPTION OF DRAWINGS

FIG. 1 is a schematic view showing a conventional method of pressing a positive electrode, a negative electrode, and a separator in the state in which the separator is interposed between the positive electrode and the negative electrode.

FIG. 2 is a view showing an electrode assembly manufacturing method according to the present invention in the form of a diagram.

FIGS. 3a to 3d are 2500× field emission-scanning electron microscope (FE-SEM) photographs showing the surfaces of polyethylene porous substrates before and after pressing electrode assemblies according to Comparative Example and Example of the present invention.

FIG. 4 is a graph showing measured resistance values of coin cells using Comparative Example (before and after pressing) and Example (before and after pressing and after discharging a polymer from pores) of the present invention.

FIG. 5 is a graph showing capacity measurement results at the time of 400 times charging and discharging using Comparative Example (A) and Example (B) of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, the present invention will be described in more detail.

FIG. 2 is a view showing an electrode assembly manufacturing method according to the present invention in the form of a diagram.

In the electrode assembly manufacturing method according to the present invention, 1) a polymer soluble in an electrolytic solution is dissolved in a solvent to manufacture a polymer solution 500, and 2) pores 310 of a separator porous substrate 300 to be used as a separator are filled with the polymer solution 500, as shown in FIG. 2(a), to form the separator porous substrate 300 having the pores 310 filled with the polymer solution, as shown in FIG. 2(b).

Any material may be used as the polymer soluble in the electrolytic solution as long as the material is a polymer that is soluble in an electrolytic solution while not reacting with other materials used in a battery. The polymer soluble in the electrolytic solution may be a PVdF-based polymer. The PVdF-based polymer may be one of PVdF, PVdF-VDF, PVdF-HFP, PVdF-TFE, PVdF-TrFE-CTFE, and PVdF-TrFE-CFE or a mixture thereof. The size (molecular weight) and concrete composition ratio of the polymer are not limited as long as the polymer is dissolved in the solvent to fill the pores 310 of the separator porous substrate 300.

The solvent may be a material other than an electrolytic solution. Preferably, the solvent dissolves the polymer well such that the pores 310 are uniformly filled with the polymer solution 500. Any material may be used as the solvent as long as the material is a solvent that is capable of dissolving the polymer and a material having lower reactivity with the polymer than the electrolytic solution. The solvent may be an organic solvent. For example, any one of an aliphatic hydrocarbon-based solvent, such as pentane, normal hexane, octane, cyclopentane, or cyclohexane, an aromatic hydrocarbon-based solvent, such as benzene, toluene, or xylene, an aldehyde-based solvent, such as furfural, a ketone-based solvent, such as acetone, methyl ethyl ketone, cyclopentanone, or cyclohexanone, an ester-based solvent, such as butyl acetate, ethyl acetate, methyl acetate, butyl propionate, ethylene glycol monoethyl ether acetate, propylene glycol monomethyl ether acetate, or 3-methoxybutyl acetate ethylene glycol diacetate, an ether-based solvent, such as tetrahydrofuran, dioxane, or ethylene glycol dimethyl ether, an alcohol-based solvent, such as methanol, ethanol, normal propyl alcohol, isopropyl alcohol, butyl alcohol, octyl alcohol, cyclohexanol, allyl alcohol, benzyl alcohol, cresol, or furfuryl alcohol, a polyol-based solvent, such as glycerol, ethylene glycol, or diethylene glycol, an alcohol ether-based solvent, such as ethylene glycol monomethyl ether, ethylene glycol monoethyl ether, ethylene glycol monobutyl ether, propylene glycol monomethyl ether, or diethylene glycol monobutyl ether, and an aprotic polar solvent, such as N-methyl-2-pyrrolidone, dimethyl sulfoxide, or dimethylformamide, or a mixture of two or more thereof may be used. Preferably, the ketone-based solvent, which does not chemically react with the PVdF-based material, is used.

The solvent is used so as to account for 10 parts by weight to 800 parts by weight, preferably 50 parts by weight to 300 parts by weight, based on 100 parts by weight of the polymer material.

The polymer solution 500 is manufactured by dissolving the polymer in the solvent within a temperature range of 0° C. to 60° C. At this time, only the polymer and the solvent may be dissolved, or a material other than the polymer and the solvent, which is configured to assist the polymer to be well dissolved in the electrolytic solution in a subsequent step while not reacting with the pores 310 of the separator porous substrate 300, may be added to manufacture the polymer solution 500.

Any porous substrate used in a battery may be used as the separator porous substrate 300. Preferably, a porous substrate having high ionic conductivity is used. At this time, each of the pores 310 of the separator porous substrate 300 generally has a diameter of 0.01 μm to 10 μm, and the separator porous substrate 300 generally has a thickness of 5 μm to 300 μm. The separator porous substrate 300 may include a polyolefin-based resin (e.g. polyethylene, polypropylene, polybutene, or polyvinyl chloride) or a mixture or a copolymer thereof, or may include a resin, such as polyethylene terephthalate, polycycloolefin, polyethersulfone, polyamide, polyimide, polyimide-amide, polyaramide, nylon, or polytetrafluoroethylene. Thereamong, the polyolefin-based resin is preferably used, since applicability of the polyolefin-based resin due to a slurry for an additional coating layer including an inorganic material is high and the thickness of the polyolefin-based resin is reduced, whereby the percentage of an electrode active material layer in the battery is increased and thus the capacity per unit volume thereof is increased. At this time, in the case in which a solid electrolyte, such as a polymer, is used as an electrolyte, the solid electrolyte may also serve as the separator.

The separator may be made of only the porous substrate, or at least one surface of the porous substrate may be coated with an inorganic material to manufacture the separator. The separator described in the specification of the present invention encompasses both the case in which the separator is made of only the porous substrate and the case in which at least one surface of the porous substrate is coated with an inorganic material to manufacture the separator. In the drawings of the present invention, however, only the separator porous substrate 300 using only the porous substrate is shown for convenience.

The polymer solution may be applied to the separator porous substrate 300, as shown in FIG. 2(*a*), such that the pores 310 of the separator porous substrate 300 are filled with the polymer solution due to gravity or diffusion. Alternatively, the separator porous substrate 300 may be impregnated with the polymer solution such that the pores 310 of the separator porous substrate 300 are filled with the polymer.

In the case in which the polymer solution 500 is applied to fill the pores 310, it is preferable that the polymer solution 500 have predetermined viscosity or higher. In the case in which the viscosity of the polymer solution 500 is low, the polymer solution 500 passes through the separator porous substrate 300 before being uniformly distributed in the pores 310, whereby it is not possible to achieve the object of the present invention. Consequently, the polymer solution 500 preferably has viscosity of a predetermined level or more. In the case in which the polymer solution 500 is applied to the separator porous substrate 300, application time is preferably about 5 minutes to about 2 hours, although the time may be changed depending on the viscosity of the polymer solution 500, the molecular weight of the polymer, the mixing ratio of the polymer, etc. In the case in which the application time is less than 5 minutes, the polymer solution 500 is not uniformly distributed in the pores 310. In the case in which the application time exceeds hours, processing time is too lengthened, which is inefficient.

In the case in which the separator porous substrate 300 is impregnated with the polymer solution 500 to fill the pores 310, it is preferable that the separator porous substrate 300 be soaked in a vessel containing the polymer solution 500 for about 5 minutes to about 10 minutes.

A step of drying the separator porous substrate 300 may be performed after filling the pores 310 of the separator porous substrate 300 with the polymer solution 500.

The drying step may be changed depending on a solvent that is used and a method of filling the pores. As an example, the drying step may be performed in a heating chamber or a vacuum oven at a temperature of 50° C. to 100° C. For example, drying using warm air, hot air, or low-humidity air, vacuum drying, or drying based on (far) infrared or electron beam radiation may be used as a drying method. In addition, a method of leaving the separator porous substrate at room temperature such that the residual solvent is volatilized from the surface of the separator porous substrate may be used. Conditions having a temperature range of 10° C. to 35° C. and a relative humidity of 40% or less may be considered. Drying is generally performed within a range of 30 seconds to 24 hours, although the drying time is not particularly defined. After the drying process, a cooling process may be further performed. In the cooling process, the separator porous substrate may be slowly cooled to room temperature.

In the case in which the polymer solution 500 is applied to fill the pores 310 of the separator porous substrate 300 therewith, the applied polymer solution 500 may be removed and then the drying step may be performed, or the drying step may be performed without removing the applied polymer solution 500. In the case in which the separator porous substrate 300 is impregnated with the polymer solution 500 to fill the pores 310, on the other hand, it is preferable that the separator porous substrate 300 be dried in the state in which the separator porous substrate 300 is impregnated with the polymer solution 500.

After the step of filling the pores 310 of the separator porous substrate 300 with the polymer solution 500, a step of further coating at least one surface of the separator porous substrate 300 may be performed. A coating layer formed through the coating may include an organic material and/or an inorganic material in order to improve the heat resistance of the separator. The coating layer may further include a flame retardant.

The inorganic material used for the coating layer is not particularly restricted as long as the inorganic material improves the heat resistance of the separator, forms additional pores, provides a uniform thickness to the coating layer, and does not undergo oxidation and/or reduction within an operation voltage range of a secondary battery to which the present invention is applied. Particularly, in the case in which inorganic particles having ion transfer ability are used, ionic conductivity of an electrochemical device may be improved, whereby performance of the electrochemical device may be improved. Also, in the case in which inorganic particles having high permittivity are used as the inorganic particles, the degree of dissociation of electrolyte salt, e.g. lithium salt, in a liquid electrolyte may be increased, whereby ionic conductivity of the electrolytic solution may be improved.

In recent years, a metal hydroxide or a metal oxide hydroxide has also been used as the inorganic material in order to improve flame retardancy, although alumina ($Al_2O_3$) was mainly used as the inorganic material. In addition, a metal oxide may be further mixed in the coating layer in addition to the metal hydroxide or the metal oxide hydroxide.

The porosity of the coating layer may range from 10% to 90%, preferably from 30% to 50%. In consideration of the object of forming a coating layer having a uniform thickness and appropriate porosity, D50 may have a range of 50 nm to 2.0 μm, although the particle size of the organic material and/or the inorganic material is not particularly restricted.

The content of the inorganic material may be 50 parts by weight to 95 parts by weight, specifically 60 parts by weight to 95 parts by weight, based on 100 parts by weight of the entire solid content of the coating layer. In the case in which the content of the inorganic material is less than 50 parts by weight based on 100 parts by weight of the entire solid content of the coating layer, the content of a binder is too large, whereby the number of empty spaces formed between inorganic particles is reduced, with the result that pore size and porosity may be reduced, and therefore performance of the battery may be rather reduced, which is undesirable. In the case in which the content of the inorganic material is greater than 90 parts by weight based on 100 parts by weight of the entire solid content of the coating layer, the content of a binder is too small, whereby the force of adhesion between the inorganic particles may be reduced, with the result that the mechanical properties of the separator may be reduced, which is also undesirable.

The coating layer may include a binder. The binder serves to stably fix the organic material and/or the inorganic material to the surface of the separator porous substrate 300. For example, the binder may be any one selected from the group consisting of polyvinylidene fluoride-hexafluoropropylene, polyvinylidene fluoride-trichloroethylene, polymethylmethacrylate, polybutylacrylate, polyacrylonitrile, polyvinylpyrrolidone, polyvinylacetate, polyethylene-co-vinylacetate, polyethyleneoxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxylmethylcellulose, tannic acid, and a compound having a large number of OH groups existing in a molecule, like tannic acid, or a mixture of two or more thereof.

The coating layer may further include a dispersant in order to further improve dispersibility of the organic material and/or the inorganic material. The dispersant serves to maintain the state in which the organic material and/or the inorganic material is uniformly dispersed in the binder at the time of manufacturing a coating layer slurry, and at least one selected from among oil-soluble polyamine, an oil-soluble amine compound, fatty acid, fatty alcohol, and sorbitan ester of fatty acid may be used. Specifically, a high molecular weight polyamine amide carboxylic acid salt may be used as the dispersant. The content of the dispersant may be 0.2 parts by weight to 10 parts by weight based on 100 parts by weight of the organic material and/or the inorganic material. In the case in which the dispersant is included so as to account for less than 0.2 parts by weight, the inorganic material is easily precipitated. In the case in which the dispersant is included so as to account for greater than 10 parts by weight, on the other hand, the force of adhesion of the coating layer to the separator porous substrate 300 is reduced, or the dispersant reacts with the electrolytic solution at the time of manufacturing a secondary battery, whereby impurities are generated.

Coating may be performed using a method of forming a slurry, distributing the slurry on the separator porous substrate, and uniformly dispersing the slurry using a doctor blade, a die casting method, a comma coating method, or a screen printing method. In addition, a slurry may be formed on a separate substrate, and the slurry may be bonded to the porous substrate using a pressing or lamination method. At this time, the thickness of the final coating layer may be adjusted by adjusting the concentration of the solution or the number of times of coating. In addition, coating may be performed using a method of applying a line dispersion solution. The line dispersion solution may be applied several times to obtain a final coating or a flame retardant layer having a desired thickness.

The coating step may be performed before the drying step or may be performed after the drying step. In the case in which the coating step is performed after the drying step, a separate drying step may be further performed.

3) A step of pressing a stack including the separator porous substrate 300 (FIG. 2(b)) obtained in the step of filling the pores 310 with the polymer solution 500 and electrodes may be performed, as shown in FIG. 2(c).

A positive electrode 100 and a negative electrode 200 that are used in the battery may be used as the electrodes.

The stack, in which the positive electrode 100, the separator porous substrate 300, and the negative electrode 200 are sequentially stacked, may be pressed at high temperature and high pressure 400 using a high-pressure press apparatus. Preferably, pressure at the time of pressing is 3 MPa to 20 MPa and temperature at the time of pressing is 50° C. to 100° C., although temperature and pressure at the time of pressing are not particularly restricted as long as the separator porous substrate 300, which will be used as a separator, and the electrodes 100 and 200 are not separated from each other. The stack may include a heat resistance layer. The heat resistance layer may be located between each electrode and the separator porous substrate 300. The heat resistance layer may include an inorganic filler, a binder, and a thickener. The weight ratio P of the binder to the thickener (binder/thickener) of the heat resistance layer is P<7.2.

A material that has high resistance to abnormal heat generated by a battery and is electrochemically stable when the battery is normally used is preferably used as the inorganic filler. For example, at least one selected from the group consisting of alumina ($Al_2O_3$), alumina hydrate (e.g. boehmite ($Al_2O_3 \cdot H_2O$)), zirconia ($ZrO_2$), magnesia (MgO), aluminium hydroxide ($Al(OH)_3$), magnesium hydroxide ($Mg(OH)_2$), and magnesium carbonate ($MgCO_3$) may be used as the inorganic filler.

The binder is not restricted as long as it is possible to bind materials, and at least one selected from the group consisting of an acrylic-based resin, styrene-butadiene rubber, a polyolefin-based resin, polytetrafluoroethylene, polyvinylidene fluoride, polyacrylonitrile, polymethylmethacrylate, and polyacrylic acid may be used as the binder.

At least one selected from the group consisting of carboxymethyl cellulose, methyl cellulose, polyacrylic acid, and polyethylene oxide may be used as the thickener. The thickener, which is an ingredient configured to provide viscosity to the heat resistance layer, may not be included in the heat resistance layer depending on the kind of the binder and the inorganic filler and the extent of the solvent.

A primary electrolytic solution may be injected into the pressed stack to discharge the polymer solution 500 in the pores 310 of the separator porous substrate 300 to the outside, as shown in FIG. 2(d). In the step of injecting the primary electrolytic solution, the stack may be in the state of being received in a battery case, or may be in the state of not being received in the battery case.

In the case in which the stack is received in the battery case, the battery case may be provided with an electrolytic solution discharge port. In the case in which the stack is not received in the battery case, the pressed stack may be soaked in a vessel containing the primary electrolytic solution, and then only the stack may be received in the battery case.

The step of discharging the polymer solution 500 to the outside is performed in order to discharge the polymer solution 500 filling the pores 310 of the separator porous substrate 300 to the outside while not affecting the function of the battery. Preferably, the stack is impregnated with the primary electrolytic solution for 5 minutes to 2 hours.

A means configured to discharge the polymer solution 500 to the outside while not damaging the separator porous substrate 300 may be added in order to discharge the polymer solution 500 in the pores 310 of the separator porous substrate 300 to the outside. A means configured to apply vibration to the separator including the separator porous substrate 300 or to move the primary electrolytic solution, with which the separator including the separator porous substrate 300 is impregnated, using ultrasonic waves may be added. As a result, the polymer solution 500 in the pores 310 may be more easily removed.

The primary electrolytic solution may be composed of a non-aqueous electrolytic solution and lithium salt. A non-aqueous organic solvent is used as the non-aqueous electrolytic solution. However, the present invention is not limited thereto.

A non-protic organic solvent, such as N-methyl-2-pyrolidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, or ethyl propionate, may be used as the non-aqueous organic solvent.

The lithium salt is a material that is readily soluble in the non-aqueous electrolytic solution. For example, LiCl, LiBr, LiI, $LiClO_4$, $LiBF_4$, $LiB_nCl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, or imide may be used as the lithium salt.

5) A step of injecting a secondary electrolytic solution into the stack may be performed after the step of injecting the primary electrolytic solution into the stack.

The step of injecting the secondary electrolytic solution is performed after the stack is received in the battery case, as shown in FIG. 2(e). The step of receiving the stack in the battery case may be performed before the step shown in FIG. 2(d). After the secondary electrolytic solution is injected, initial charging and discharging may be performed in the state in which the battery case is completely or temporarily hermetically sealed or in the state in which the battery case is not hermetically sealed.

The secondary electrolytic solution may be a material that is mixable with the primary electrolytic solution. In addition, the primary electrolytic solution and the secondary electrolytic solution may be the same material.

The secondary electrolytic solution may be composed of a non-aqueous electrolytic solution and lithium salt. A non-aqueous organic solvent is used as the non-aqueous electrolytic solution. However, the present invention is not limited thereto.

A non-protic organic solvent, such as N-methyl-2-pyrolidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, or ethyl propionate, may be used as the non-aqueous organic solvent.

The lithium salt is a material that is readily soluble in the non-aqueous electrolytic solution. For example, LiCl, LiBr, LiI, $LiClO_4$, $LiBF_4$, $LiB_nCl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, or imide may be used as the lithium salt.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dye, N-substituted oxazolidinone, N,N-substituted imidazolidine, ethylene glycol dialkyl ether, ammonium salt, pyrrole, 2-methoxy ethanol, aluminum trichloride, or the like may be added to the non-aqueous electrolytic solution. Depending on circumstances, in order to impart incombustibility thereto, the non-aqueous electrolytic solution may further include a halogen-containing solvent, such as carbon tetrachloride or ethylene trifluoride. Furthermore, in order to improve the high-temperature retention characteristics thereof, the non-aqueous electrolytic solution may further include carbon dioxide gas. Moreover, fluoro-ethylene carbonate (FEC) and propene sultone (PRS) may be further included.

In the case in which a solid electrolyte is stacked, like a battery, instead of the separator including the separator porous substrate 300 according to the present invention, the secondary electrolytic solution may not be injected.

Hereinafter, the present invention will be described with reference to the following example. The example is provided only for easier understanding of the present invention and should not be construed as limiting the scope of the present invention.

In the following example and comparative example, a positive electrode obtained by coating a slurry, which was a mixture of $LiCoO_2$, as a positive electrode active material, polyvinylidene fluoride (PVdF), as a binder, and carbon, as a conducting agent, on aluminum foil and a negative electrode obtained by coating a slurry, which was a mixture of graphite, as a negative electrode active material, and styrene-butadiene rubber, as a binder, on copper were used, a polyethylene porous substrate was used as a separator porous substrate, and no separate coating layer was formed on the separator porous substrate.

EXAMPLE

In Example of the present invention, an electrode assembly according to the present invention was manufactured through the following steps.

① PVdF-HFP was dissolved in acetone, as a ketone-based solvent, to manufacture a polymer solution.

② The polymer solution was applied to a polyethylene porous substrate, as a separator, for 10 minutes and was then dried.

③ The separator of step ② was coated with aluminum oxide particles having D50 of 50 nm to 2.0 μm.

④ The coated separator of step ③ was stacked with a positive electrode and a negative electrode, and the stack was pressed at a pressure of about 19.61 MPa (200 kgf/cm²) and a temperature of 50° C. using a high-pressure press apparatus.

COMPARATIVE EXAMPLE

In Comparative Example provided for comparison with the present invention, steps of manufacturing and applying a polymer solution, which correspond to steps ① and ② of the present invention, were excluded.

Experimental Example 1

The thicknesses of the electrode assemblies according to Example and Comparative Example before pressing and after pressing using the high-pressure press apparatus were measured. Only the thickness of a pore portion of the polyethylene porous substrate was measured through electron microscope photographs of samples before and after pressing. 2500× photographs of the surfaces of the samples measured using a field emission-scanning electron microscope (FE-SEM) (Hitachi S-4800 Scanning Electron Microscope) are shown in FIGS. 3a to 3d. FIGS. 3a to 3d are 2500× field emission-scanning electron microscope (FE-SEM) photographs showing the surfaces of polyethylene porous substrates before and after pressing electrode assemblies according to Comparative Example and Example of the present invention. Here, A indicates Comparative Example, and B indicates Example. FIGS. 3a and 3b are photographs before pressing, and FIGS. 3c and 3d are photographs after pressing. Only the thicknesses of the polyethylene porous substrates were measured, and the averages of the measured values are shown in Table 1 below.

Experimental Example 2

The weights per unit area of the electrode assemblies according to Example and Comparative Example before pressing and after pressing using the high-pressure press apparatus were measured. The measured values are shown in Table 1 below.

Experimental Example 3

Air permeability (Gurley number) of each of the electrode assemblies according to Example and Comparative Example was measured using ASTM D726-94 method. Here, air permeability (Gurley number), which is resistance to the flow of air, was measured using a Gurley densometer. Here, an air permeability value is expressed by time (seconds) taken until 100 cc of air passes through a section of 1 mm² of each of the electrode assemblies manufactured according to Example and Comparative Example under a pressure of 12.2 in.H₂O, i.e. air permeation time. The results thereof are shown in Table 1 below.

TABLE 1

|  | Comparative Example (before pressing) | Comparative Example (after pressing) | Example (before pressing) | Example (after pressing) |
| --- | --- | --- | --- | --- |
| Thickness (μm) | 7.0 | 6.5 | 7.0 | 6.9 |
| Weight (g/m²) | 4.1 | 4.1 | 6.3 | 6.3 |
| Gurley (sec/100 cc) | 110 | 130 | 10,000 | 10,000 |

As shown in Table 1 above, when comparing Comparative Example before and after pressing with each other, the thickness of Comparative Example was reduced by about 7%, and time taken until 100 cc of air passed through the Comparative Example was increased. In contrast, it can be seen that, in the present invention, there was no change in thickness and air permeability.

In both Comparative Example and Example, there was no change in weight per unit area before and after pressing. The reason that the weight per unit area of Example was about 100 times the weight per unit area of Comparative Example is that pores of the separator porous substrate of Example were filled with the polymer solution. In the case in which the sizes of the pores of Example are changed by pressing, there may be a difference in weight of Example before and after pressing. As can be seen from Table 1 above, there was no difference in weight of Example before and after pressing. Consequently, it can be indirectly seen that, in the electrode assembly according to the present invention, the form and size of the pores before pressing are maintained.

In Comparative Example, there was no difference in weight per unit area even though the thickness thereof was reduced after pressing. The reason for this is that the pores of Comparative Example were filled with air and that a change in the amount of air due to a decrease in thickness was substantially very small.

The reason that the Gurley number, which indicates air permeability, was large in Example is that movement of air was delayed due to the polymer solution filling the pores of the separator porous substrate according to Example.

It is revealed that air permeability of Example according to the present invention is not good, compared to Comparative Example. However, this is caused by the polymer solution. It can be seen from the results of the table above that the thickness and physical properties of the pores of the porous substrate according to Example of the present invention were not changed even after pressing.

FIGS. 3a to 3d are electron microscope photographs showing the electrode assemblies according to Comparative Example and Example of the present invention before and after pressing using the high-pressure press apparatus. FIGS. 3a to 3d mainly show the porous substrates. In FIGS. 3a to 3d, A indicates photographs of Comparative Example, and B indicates photographs of Example. Before pressing is indicated by "Before lamination," and after pressing is indicated by "After lamination." The numerical values shown in FIGS. 3a to 3d indicate the measured thicknesses of only the porous substrates. The values shown in Table 1 indicate the averages of the thicknesses of only the porous substrates.

The thickness of the porous substrate according to the present invention before pressing is 7 μm. As can be seen from FIGS. 3a to 3d, the thicknesses of the porous substrate according to Comparative Example before and after pressing are different from each other. The thickness of a thin portion (a greatly pressed portion) of the pressed porous substrate is 4.5 μm, and the thickness of a thick portion (a non-pressed portion) of the pressed porous substrate is 7 μm. Consequently, it can be seen that the porous substrate was greatly deformed and that a change of the porous substrate was not uniform.

In contrast, it can be seen that there was little change between the thicknesses of the porous substrate according to Example of the present invention before and after pressing and that the thickness of the porous substrate was very uniform. The thickness of the porous substrate according to Example measured after pressing was 6.9 μm, which is very similar to the thickness of the porous substrate before pressing, which was 7 μm. It can be seen that there was little change in the porous substrate of the electrode assembly according to the present invention before and after pressing and that the porous substrate was also uniform.

Experimental Example 4

In Experimental Example 4, coin cells were manufactured using the electrode assemblies according to Example and Comparative Example, and impedance values of the coin cells were measured under conditions of a frequency of 300,000 Hz to 0.1 Hz and an AC amplitude of 10 mA using a Solartron analytical EIS. FIG. 4 shows resistance values, among the results. FIG. 4 is a graph showing measured resistance values of coin cells using Comparative Example (before and after pressing) and Example (before and after pressing and after discharging the polymer from the pores) of the present invention.

In an electrode assembly, a positive electrode and a negative electrode are stacked on a separator, and then lamination thereof is performed. In order to confirm the effect according to the present invention, however, the electrode assemblies according to Example and Comparative Examples were measured using various methods.

B: In order to remove the polymer solution filling the pores of the electrode assembly according to Example, propylene carbonate, which is a primary electrolytic solution, was injected to discharge PVdF-HFP located in the pores of the separator to the outside, and a second electrolytic solution, which is made of the same material as the primary electrolytic solution, was injected to manufacture a coin cell.

B": A coin cell was manufactured using the electrode assembly according to Example, and propylene carbonate was used as an electrolytic solution. Compared to B, there is no step of removing the polymer solution using a primary electrolytic solution.

B': Compared to B", there is a difference only in the fact in that the electrode assembly according to Example was not pressed.

A": Compared to B", there is a difference only in the fact in that the electrode assembly according to Comparative Example was used.

A': Compared to B', there is a difference only in the fact in that the electrode assembly according to Comparative Example was used.

Referring to FIG. 4, it can be seen that, in Comparative Example, the resistance value of the battery was changed from 0.53Ω (before pressing) to 0.57Ω (after pressing), whereby there was a great difference; however, in the present invention, the resistance value of the battery before pressing, which was 0.55Ω, and the resistance value of the battery after pressing, which was 0.55Ω, are equal to each other.

In the case of B, in which the primary electrolytic solution was used to remove the polymer material in the pores, the resistance value after pressing was 0.53Ω, which is equal to the resistance value (A') in the initial state in which there was no polymer material in pores and pressing was not performed. As a result, it can be seen that, in the case in which the electrode assembly manufacturing method according to the present invention is used, the physical properties of the porous substrate are not substantially changed.

Experimental Example 5

The coin cells according to B and A" were charged to 0.5 C and 1.1 V at 23° C., and were discharged to 3.0 V at a constant current of 1 C. In this way, charging and discharging were performed 400 times, and capacities were measured at every 50 cycles. The results are shown in FIG. 5.

FIG. 5 is a graph showing capacity measurement results at the time of 400 times charging and discharging using Comparative Example (A) and Example (B) of the present invention.

As shown in FIG. 5, it can be seen that the capacity retention rate of the battery according to Example of the present invention was greater than the capacity retention rate of the battery according to Comparative Example. This indirectly suggests that porosity of the separator is uniformly maintained and that distortion of the separator is small.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: Positive electrode
200: Negative electrode
300: Separator porous substrate
310: Pores
400: Pressing
500: Polymer solution

INDUSTRIAL APPLICABILITY

As is apparent from the above description, in an electrode assembly manufacturing method according to the present invention, pores of a separator porous substrate to be used as a separator are filled with a polymer solution in steps of stacking and pressing electrodes and the separator, and therefore the form or volume of the pores is not changed. Consequently, porosity of the separator after an electrode assembly is manufactured is similar to porosity of the separator before stacking. As a result, a battery including the electrode assembly according to the present invention has high ionic conductivity and excellent performance.

In the case in which the electrode assembly manufacturing method according to the present invention is used, therefore, it is possible to provide an electrode assembly that is economical, simple, and greatly improved in performance and lifespan thereof.

The invention claimed is:

1. An electrode assembly manufacturing method comprising:
   1) dissolving a polymer soluble in an electrolytic solution in a solvent to form a polymer solution;
   2) filling pores of a porous substrate with the polymer solution of step 1) to form a separator;
   3. manufacturing a stack comprising the separator of step 2) and at least one electrode by pressing;
   4) injecting a primary electrolytic solution into the stack of step 3) to discharge the polymer solution in the pores of the separator to an outside of the stack; and
   5) injecting a secondary electrolytic solution into the stack of step 4).

2. The electrode assembly manufacturing method according to claim 1, wherein the solvent of step 1) is not an electrolytic solution.

3. The electrode assembly manufacturing method according to claim 1, wherein filling the pores of the porous substrate with the polymer solution of step 2) comprises applying the polymer solution to the porous substrate or impregnating the porous substrate with the polymer solution.

4. The electrode assembly manufacturing method according to claim 1, further comprising drying the separator after step 2).

5. The electrode assembly manufacturing method according to claim 1, further comprising further coating at least one surface of the separator after step 2).

6. The electrode assembly manufacturing method according to claim 1, wherein the stack comprises a heat resistance layer in step 3).

7. The electrode assembly manufacturing method according to claim 1, wherein the pressing of step 3) is performed at a pressure of 3 MPa to 20 MPa and a temperature of from 50° C. to 100° C.

8. The electrode assembly manufacturing method according to claim 1, wherein the primary electrolytic solution and the secondary electrolytic solution are mixable with each other.

9. The electrode assembly manufacturing method according to claim 1, wherein the primary electrolytic solution and the secondary electrolytic solution are identical to each other.

10. The electrode assembly manufacturing method according to claim 1, wherein
    the polymer soluble in the electrolytic solution in step 1) is a PVdF-based polymer, and
    the solvent is an organic solvent.

11. The electrode assembly manufacturing method according to claim 1, further comprising performing initial charging and discharging after step 5).

* * * * *